United States Patent
Hirakawa et al.

(10) Patent No.: US 6,204,336 B1
(45) Date of Patent: Mar. 20, 2001

(54) HIGH-RIGIDITY ETHYLENE/PROPYLENE BLOCK COPOLYMER AND PROCESS FOR THE PRODUCTION THEREOF

(75) Inventors: Manabu Hirakawa, Tsukuba; Kenichi Ohkawa, Ichihara; Teruhiko Doi, Konan, all of (JP); Tetsuya Hisayama, Bartlesville, OK (US); Yuichi Miyake, Nagoya; Takeyoshi Nishio, Okazaki, both of (JP)

(73) Assignees: Sumitomo Chemical Company, Osaka; Toyota Jidosha Kabushiki Kaisha, Toyota, both of (JP)

( * ) Notice: Subject to any disclaimer, the term of this patent is extended or adjusted under 35 U.S.C. 154(b) by 0 days.

(21) Appl. No.: 09/155,506

(22) PCT Filed: Apr. 7, 1996

(86) PCT No.: PCT/JP97/01182

§ 371 Date: Sep. 30, 1998

§ 102(e) Date: Sep. 30, 1998

(87) PCT Pub. No.: WO97/38033

PCT Pub. Date: Oct. 16, 1997

(30) Foreign Application Priority Data

Apr. 8, 1996 (JP) .................................................. 08-085495

(51) Int. Cl.[7] ............................ C08F 4/00; C08F 287/00; C08F 289/00; C08F 291/00; C08F 293/00

(52) U.S. Cl. ............................ 525/244; 524/505; 525/88; 525/89; 525/323

(58) Field of Search ................................ 525/88, 89, 323, 525/244; 524/505

(56) References Cited

FOREIGN PATENT DOCUMENTS

| | | |
|---|---|---|
| 0 534 776 | 3/1993 | (EP) . |
| 5-86256 | 4/1993 | (JP) . |
| 5-194685 | 8/1993 | (JP) . |
| 6-172465 | 6/1994 | (JP) . |
| 7-286022 | 10/1995 | (JP) . |
| 8-231662 | 9/1996 | (JP) . |
| 8-269124 | 10/1996 | (JP) . |

OTHER PUBLICATIONS

International Search Report, PCT/JP97/01182, 6/1997.

*Primary Examiner*—Patrick D. Niland
(74) *Attorney, Agent, or Firm*—Sughrue, Mion, Zinn, Macpeak & Seas, PLLC

(57) ABSTRACT

A high rigidity ethylene-propylene block copolymer which is composed of (I) a crystalline polypropylene portion and (II) an ethylene-propylene random copolymer portion, and in which the crystalline polypropylene portion (I) has a Q value of not more than 5 which is the weight average molecular weight (Mw)/number average molecular weight (Mn) ratio obtained by a gel permeation chromatography (GPC) method, an isotactic pentad fraction of not less than 0.98 as calculated from $^{13}$C-NMR, and an intrinsic viscosity of 0.6 to 0.88 dl/g as measured at 135° C. in tetralin; the ethylene-propylene random copolymer portion (II) has an intrinsic viscosity of 4.0 to 6.0 dl/g as measured at 135° C. in tetralin and an ethylene/propylene ratio of 25/75 to 35/65 by weight; and when the total of the above polymers ((I)+(II)) is taken as 100% by weight, the content of the ethylene-propylene random copolymer portion (II) is 8 to 22% by weight, and a process for producing the same.

5 Claims, No Drawings

HIGH-RIGIDITY ETHYLENE/PROPYLENE BLOCK COPOLYMER AND PROCESS FOR THE PRODUCTION THEREOF

TECHNICAL FIELD

This invention relates to a high rigidity ethylene-propylene block copolymer having excellent in rigidity, impact resistance and fluidity.

BACKGROUND ART

Polypropylene (including ethylene-propylene block copolymers) has excellent characteristics and is relatively inexpensive, and hence, has been widely used in automobile outer plate materials and interior trim materials. However, the wall-thinning of a polypropylene molded article is now proceeding as the molded article has been made large in size and light in weight.

Therefore, a high rigidity polypropylene excellent in rigidity and impact resistance has been desired.

The present situation is that when a high melt-fluidity polypropylene has been produced by polymerization, the polypropylene is very brittle and there has not been obtained such a polymer as to withstand the practical use. On the other hand, as a method of improving the melt-fluidity, there has been known a method which comprises adding a small amount of an organic peroxide to a low melt-fluidity polypropylene or its composition and heat-treating the mixture. However, the polypropylene obtained by such a method is remarkably low in rigidity and, in addition, has a problem of an odor due to the heat-treatment and in addition such a problem that a flow mark is caused on the surface of an injection molded article, or the like. Accordingly, it has been strongly desired to develop a polypropylene excellent in rigidity, impact strength, melt-fluidity and the like without requiring such a heat treatment.

DISCLOSURE OF INVENTION

In view of such a situation of prior art, it is an object of this invention to provide an ethylene-propylene block copolymer excellent in rigidity and impact strength and also good in melt-fluidity, and provide a process for producing the same.

According to this invention, there is provided a high rigidity ethylene-propylene block copolymer which is composed of (I) a crystalline polypropylene portion and (II) an ethylene-propylene random copolymer portion, and in which the crystalline polypropylene portion (I) has a Q value of not more than 5 which is the weight average molecular weight (Mw)/number average molecular weight (Mn) ratio obtained by a gel permeation chromatography (GPC) method, an isotactic pentad fraction of the crystalline polypropylene portion (I) of not less than 0.98 as calculated from $^{13}$C-NMR, an intrinsic viscosity of 0.6 to 0.88 dl/g as measured at 135° C. in tetralin; the ethylene-propylene random copolymer portion (II) has an intrinsic viscosity of 4.0 to 6.0 dl/g as measured at 135° C. in tetralin and an ethylene/propylene weight ratio of 25/75 to 35/65; and when the total of the polymers [(I)+(II)] is taken as 100% by weight, the proportion of the ethylene-propylene random copolymer portion (II) is 8 to 22% by weight.

According to this invention, there is also provided a process for producing a high rigidity ethylene-propylene block copolymer which comprises effecting reaction for producing (I) a crystalline polypropylene portion using a solid catalyst comprising, as the essential components, magnesium, titanium, a halogen and an aluminum compound, in the presence of a solvent and subsequently effecting reaction for producing (II) an ethylene-propylene random copolymer portion, characterized by controlling the reaction conditions so that the crystalline polypropylene portion (I) and the ethylene-propylene random copolymer portion (II) have the above-mentioned respective characteristics. This invention is explained in more detail below.

The ethylene-propylene block copolymer in this invention comprises (I) a polypropylene portion composed of a propylene homopolymer or a copolymer of propylene and not more than 1 mole % of ethylene or an α-olefin having 4 or more carbon atoms (for example, butene-1, hexene-1 or the like), and (II) an ethylene-propylene random copolymer portion in which the composition of ethylene and propylene is such that the ethylene/propylene weight ratio is 25/75 to 35/65; and the ethylene-propylene random copolymer portion (II) is contained in a proportion of 8 to 22% by weight based on the overall polymer.

In this invention, the ethylene-propylene block copolymer is obtained by reacting the monomers in two steps in the presence of a solid catalyst system comprising, as the essential components, magnesium, titanium, a halogen and an aluminum compound. The catalyst is preferably a catalyst system comprising (A) a trivalent titanium compound-containing solid catalyst component (a complex of titanium trichloride and magnesium), (B) an organoaluminum compound and (C) an electron-donating compound.

A method for producing this catalyst system is described in detail in, for example, JP-A-61-218,606, JP-A-1-319,508 and the like.

That is to say, it is a catalyst system comprising (A) a trivalent titanium compound-containing solid catalyst component obtained by treating, with an ester compound, an ether compound and titanium tetrachloride, a solid product obtained by reducing a titanium compound represented by the general formula Ti(OR$^1$)$_n$X$_{4-n}$ wherein R$^1$ represents a hydrocarbon group having 1 to 20 carbon atoms, X represents a halogen atom and n is 0<n≦4, with an organomagnesium compound in the coexistence of a silicon compound having a Si—O bond and an ester compound; (B) an organoaluminum compound; and (C) an electron-donating compound.

The titanium compound used in the synthesis of the above solid catalyst component (A) is a compound represented by the above-mentioned general formula and R$^1$ is preferably an alkyl group having 2 to 18 carbon atoms or an aryl group having 6 to 18 carbon atoms. As the halogen atom represented by X, chlorine, bromine and iodine can be exemplified, and among them, chlorine is particularly preferable.

The value of n of the titanium compound represented by the above-mentioned general formula is 0<n≦4, preferably 2≦n≦4, and particularly preferably n=4.

The organosilicon compound having a Si—O bond used in the synthesis of the above solid catalyst component (A) is a compound represented by the general formula Si(OR$^2$)$_m$R$^3_{4-m}$, R$^4$(R$^5_2$SiO)$_p$R$^6_3$ or (R$^7_2$SiO)$_q$ wherein R$^2$ represents a hydrocarbon group having 1 to 20 carbon atoms; R$^3$, R$^4$, R$^5$, R$^6$ and R$^7$ are hydrocarbon groups having 1 to 20 carbon atoms or hydrogen atoms; m is 0<m≦4; p is an integer of 1 to 1,000; and q is an integer of 2 to 1,000.

Specific examples of the organosilicon compound include tetramethoxysilane, dimethyldimethoxysilane, diethoxydiethylsilane, diethoxydiphenylsilane, triethoxyphenylsilane, cyclohexylethyldimethoxysilane, phenyltrimethoxysilane and the like, and among these organosilicon compounds, preferable are alkoxysilane compounds represented by the general formula $Si(OR^2)_m R^3_{4-m}$. In this formula, $1 \leq m \leq 4$ is preferred, and tetra-alkoxysilane compounds corresponding to m=4 are particularly preferred.

As the organomagnesium compound used in the synthesis of the above solid catalyst component (A), there can be used any type organomagnesium compound having a magnesium-carbon bond. In particular, Grignard compounds represented by the general formula $R^8MgX$ in which $R^8$ represents a hydrocarbon group having 1 to 20 carbon atoms and X represents a halogen, and dialkylmagnesium compounds or dialkylmagnesium compounds represented by the general formula $R^9R^{10}Mg$ in which $R^9$ and $R^{10}$ represent hydrocarbon groups having 1 to 20 carbon atoms are suitably used. In the above formula, $R^9$ and $R^{10}$ may be the same or different.

As the ester compound used in the synthesis of the above solid catalyst component (A), there are mentioned mono- and polycarboxylic acid esters such as aliphatic carboxylic acid esters, olefinic carboxylic acid esters, alicyclic carboxylic acid esters, aromatic carboxylic acid esters and the like. Among these ester compounds, preferable are olefinic carboxylic acid esters such as methacrylic acid esters, maleic acid esters and the like and phthalic acid esters, and particularly preferable are diesters of phthalic acid.

As the ether compound, preferable are dialkyl ethers such as diethyl ether, di-n-propyl ether, diisopropyl ether, dibutyl ether, diamyl ether, methyl n-butyl ether and the like, and particularly preferable are di-n-butyl ether and diisoamyl ether.

The above solid catalyst component (A) is synthesized by treating, with an ester compound, a solid product obtained by reducing a titanium compound with a magnesium compound in the presence of an organosilicon compound and an ester compound and then treating the resulting product with a mixture of an ether compound and titanium tetrachloride or with a mixture of an ether compound, titanium tetrachloride and an ester compound. These synthesis reactions are all effected in an atmosphere of an inert gas such as nitrogen, argon or the like.

The reduction temperature is in the range of from −50° C. to 70° C., preferably from −30° C. to 50° C., particularly preferably from −25° C. to 35° C.

The organoaluminum compound of the above component (B) is one represented by the general formula $R^{11}_r AlY_{3-r}$ or $R^{12}R^{13}Al—O—AlR^{14}R^{15}$ in which $R^{11}$ to $R^{15}$ represent hydrocarbon groups having 1 to 20 carbon atoms, Y represents a halogen, hydrogen or an alkoxy group, and r is a positive number represented by $2 \leq r \leq 3$, and having at least one aluminum-carbon bond in the molecule.

Specific examples of the organoaluminum compound include trialkylaluminums such as triethylaluminum, triisobutylaluminum, trihexylaluminum and the like; dialkylaluminum halides such as diethylaluminum halides, diisobutylaluminum halides and the like; mixtures of triethylaluminum and dialkylaluminum halides; and alkylalumoxanes such as tetraethyldialumoxane, tetrabutyldialumoxane and the like.

Among these organoaluminum compounds, preferable are trialkylaluminums; mixtures of trialkylaluminums with diethylaluminum chloride; and tetraethyldialumoxane.

The amount of the organoaluminum compound used can usually be selected from such a broad range as 0.5 to 1,000 moles per mole of titanium atom in the solid catalyst component (A), and in particular, the range of from 1 to 600 moles is preferred.

As the electron-donating compound of the above component (C), there can be mentioned oxygen-containing electron donors such as alcohols, phenols, ketones, aldehydes, carboxylic acids, esters of organic or inorganic acids, ethers, acid amides, acid anhydrides and the like; nitrogen-containing electron donors such as ammonias, nitrites, isocyanates and the like; etc. Among these electron donors, preferably used are esters of inorganic acids and ethers.

The ratio of the aluminum compound of the component (B) to the complex of a titanium compound and a magnesium compound of the component (A) can be selected from the range of from 3/1 to 20/1 by mole. Also, the ratio of the silane compound having a Si—O bond to the complex of a titanium compound and a magnesium compound can be selected from the range of from 1/10 to 1/2 by mole.

The ethylene-propylene block copolymer of this invention is composed of the following components (I) and (II):

(I) The crystalline polypropylene portion has:
  (1) an intrinsic viscosity $[\eta]_P$ of 0.6 to 0.88 dl/g as measured at 135° C. in tetralin,
  (2) a Q value determined by GPC (weight average molecular weight Mw/number average molecular weight Mn) of not more than 5, preferably 3 to 5, and
  (3) an isotactic pentad fraction of not less than 0.98 as calculated from $^{13}$C-NMR, and
  (4) occupies 92 to 78% by weight of the amount of the overall copolymer.

(II) The ethylene-propylene random copolymer portion has:
  (1) an intrinsic viscosity $[\eta]_{EP}$ of 4.0 to 6.0 dl/g as measured at 135° C. in tetralin and
  (2) a composition of ethylene and propylene of 25/75 to 35/65 by weight, and
  (3) occupies 8 to 22% by weight of the amount of the overall copolymer.

The polymerization conditions for producing the ethylene-propylene block copolymer of this invention can be freely selected to carry out the polymerization. That is, the polymerization can be carried out in the presence of an inert hydrocarbon such as an aliphatic hydrocarbon, for example, butane, pentane, hexane, heptane or the like; an alicyclic hyrocarbon, for example, cyclohexane, methylcyclohexane or the like; an aromatic hydrocarbon, for example, benzene, toluene, xylene or the like; or a mixture thereof, and can also be carried out using the polymerizing monomer per se as a polymerization solvent. In addition, it can be carried out even in a medium composed of the polymerizing monomer in the gaseous state. It is preferable to carry out the reaction in the state that hydrogen is present as a molecular weight regulator in the reaction system. The amount of the hydrogen fed is determined depending upon the use in which the product which is the ethylene-propylene block copolymer is employed. Since the hydrogen feed balance in the first stage polymerization and the second stage polymerization is varied depending upon the polymerization conditions, the molecular weight of the desired copolymer and the like, it is necessary to suitably control the feed balance corresponding to them. The polymerization reactions in the first stage and the second stage may be under the same conditions or different conditions; however, usually, the polymerization temperature is 0 to 200° C., preferably 20 to 80° C. The polymerization pressure is any pressure, for example, from normal pressure to 100 kg/cm$^2$G, and can be freely selected depending upon the polymerization method. As the polymerization style, it is possible to effect each stage of polymerization by a batchwise system using one polymerization vessel or at least two polymerization vessels, or it is also possible to continuously effect the polymerization. The ethylene-propylene block copolymer of this invention is produced by subjecting the above components (I) and (II) to reaction successively in two stages by a slurry polymerization method or a gas phase polymerization method; however the slurry polymerization method is suitable.

When the intrinsic viscosity $[\eta]_P$ of the component (I) is less than 0.6 dl/g, the mechanical strength is reduced, and when it exceeds 0.88 dl/g, the melt-fluidity of the ethylene-propylene block copolymer is reduced, and hence, it is impossible to obtain the high fluidity polypropylene aimed at by this invention. Also, when the Q value exceeds 5, the elongation characteristics of the ethylene-propylene block copolymer are deteriorated.

When the intrinsic viscosity $[\eta]_{EP}$ of the component (II) is less than 4.0 dl/g, the impact resistance is low and when it exceeds 6.0 dl/g, the impact resistance is deteriorated owing to the failure of dispersion of the constituents of the composition. Also, it is not desirable that the ethylene content of the ethylene-propylene random copolymer is less than 25% by weight or exceeds 35% by weight because the impact resistance of a molded article is deteriorated. The ethylene-propylene block copolymer of this invention has a melt-flow index (MI) of not less than 50 g/10 minutes, preferably not less than 60 g/10 minutes as measured at 230° C. under a load of 2.16 kg. When the MI is less than 50 g/10 minutes, the high fluidity polymer aimed at by this invention is not obtained. Also, the ethylene-propylene block copolymer of this invention is more preferably one having a flexural modulus of not less than 13,000 kg/cm² (more preferably 14,000 kg/cm²) and an Izod impact strength of not less than 4.0 kg·cm/cm as measured at 23° C.

When the isotactic pentad fraction is less than 0.98 as calculated from $^{13}$C-NMR of the component (I), the ethylene-propylene block copolymer containing the same is not satisfactory in heat resistance, rigidity and scratch resistance and hence it is not desirable.

The ethylene-propylene block copolymer of this invention can have compounded therewith additives such as an antioxidant, an ultraviolet absorber, a lubricant, an antistatic agent, a copper-pollution-preventing agent, a flame-retardant, a neutralizing agent, a nucleating agent, a foaming agent, a plasticizer, a pigment, a dye and the like depending upon the purpose. Among these additives, an antioxidant and an ultraviolet absorber are desirably added for enhancing the heat resistance, the weather resistance and the oxidation stability.

An explanation is made below of methods for measuring the above-mentioned various physical properties.

The isotactic pentad fraction is the fraction of the propylene monomer unit existing at the center of the isotactic chain in the form of a pentad unit, in other words, the chain in which five propylene monomer units are successively meso-bonded, in the crystalline polypropylene molecular chain, as measured by the method disclosed in A. Zambelli et al., Macromolecules, 6, 925 (1973), that is, by use of $^{13}$C-NMR. However, the attribution of NMR absorption peak is based on Macromolecules, 8, 687 (1975) published thereafter.

Specifically, an isotactic pentad fraction is measured as the area fraction of mmmm peak in the overall absorption peak in the methyl carbon region of the $^{13}$C-NMR spectrum. When the isotactic pentad fraction of NPL standard substance CRM No. M19-14 Polypropylene PP/MWD/2 of NATIONAL PHYSICAL LABORATORY in U. K. was measured by the above method, it was 0.944.

Also, the weight ratio X of the ethylene-propylene random copolymer portion (II) to the overall block copolymer can be determined by calculation from the following equation by measuring the quantity of heat of crystal-fusion of each of the crystalline polypropylene portion (I) and the overall block copolymer:

$$X = 1 - (\Delta Hf)_T/(\Delta Hf)_P$$

$(\Delta Hf)_T$: Quantity of heat of fusion of the overall block copolymer (cal/g), $(\Delta Hf)_P$: Quantity of heat of fusion of the crystalline polypropylene portion (cal/g).

The ethylene content of the ethylene-propylene random copolymer portion can be determined by calculation from the following equation by measuring, in weight %, the ethylene content in the overall block copolymer by the infrared absorption spectrum method:

$$(C2')_{EP} = (C2')_T/X$$

$(C2')_T$: Ethylene content of the overall block copolymer (% by weight)

$(C2')_{EP}$: Ethylene content of the ethylene-propylene random copolymer portion (% by weight).

Moreover, the intrinsic viscosity $[\eta]_{EP}$ of the ethylene-propylene random copolymer portion as measured at 135° C. in tetralin can be determined by calculation from the following equation by measuring the intrinsic viscosity of each of the crystalline polypropylene portion and the overall block copolymer:

$$[\eta]_{EP} = [\eta]_T/X - (1/X - 1)[\eta]_P$$

$[\eta]_P$: Intrinsic viscosity of the crystalline polypropylene portion (dl/g)

$[\eta]_T$: Intrinsic viscosity of the overall block copolymer (dl/g).

BEST MODE FOR CARRYING OUT THE INVENTION

This invention is explained below by Examples; however, these are merely illustrative, and this invention is not limited to these Examples unless it oversteps the gist.

Methods for measuring physical properties in the Examples are shown below:

(1) GPC measuring conditions

Measurement was made under the following conditions by a gel permeation chromatography (GPC). Also, a calibration curve was prepared using the standard polystyrene.
Kind of machine: Model 150 CV manufactured by Millipore Waters Company.
Column: Shodex M/S 80
Measurement temperature: 145° C.
Solvent: o-dichlorobenzene
Sample concentration: 5 mg/8 ml Incidentally, when the Standard Reference Material 706 (polystyrene of Mw/Mn=2.1) of NBS (National Bureau of Standards) was measured under the above conditions, a molecular weight distribution (Q value) Mw/Mn=2.1 was obtained.

(2) Melt flow index (MI)

According to the method prescribed in JIS K 6758. Measured at a temperature of 230° C. under a load of 2.16 kg.

(3) Flexural test

According to the method prescribed in JIS K 7203. A test specimen molded by a press molding at 230° C. is used. Flexural modulus and flexural strength are evaluated under the conditions that the thickness of the test specimen is 4.0 mm, the span is 64 mm and the loading rate is 2.0 mm/min. The measurement temperature is 23° C.

(4) Izod impact strength

According to the method prescribed in JIS K 7110. A test specimen molded by press molding at 230° C. is used. The thickness of the test specimen is 5.0 mm and the notched impact strength of a test specimen notch-processed after molding is evaluated. The measurement temperature is 23° C.

EXAMPLE 1

A. Synthesis of Solid Catalyst Component (1) Synthesis of solid product

A 200-liter reaction vessel equipped with a stirrer and a dropping funnel was purged with nitrogen and thereafter charged with 80 liters of hexane, 2.23 liters (2.23 kg, 6.55 moles) of tetrabutoxytitanium, 0.75 liter (0.78 kg, 2.8 moles) of diisobutyl phthalate and 22.1 liters (20.6 kg, 98.9 moles) of tetraethoxysilane, to prepare a uniform solution. Subsequently, 51 liters of a dibutyl ether solution of butylmagnesium chloride at a concentration of 2.1 moles/liter was gradually dropped thereinto over 5 hours while the temperature in the reaction vessel was kept at 5° C. After completion of the dropwise addition, the contents were stirred at room temperature for an additional one hour and thereafter subjected to solid-liquid separation at room temperature, after which washing with 70 liters of toluene was repeated 3 times. Thereafter, toluene was added so that the slurry concentration became 0.2 kg/liter.

A part of the solid product was sampled and subjected to composition analysis to find that the solid product contained 1.7% by weight of titanium atom, 0.1% by weight of phthalic acid ester, 32.7% by weight of ethoxy group and 3.5% by weight of butoxy group.

(2) Synthesis of ester-treated solid

A 200-liter reaction vessel was purged with $N_2$ and thereafter 13.26 kg (47.6 moles) of diisobutyl phthalate was added to a slurry containing the solid product obtained in (1) above, after which reaction was effected at 95° C. for 30 minutes. After the reaction, the reaction mixture was subjected to solid-liquid separation and the solid portion was washed twice with 70 liters of toluene.

(3) Synthesis of solid catalyst component (activation treatment)

After completion of the washing in (2) above, toluene, 0.87 kg (3.13 moles) of diisobutyl phthalate, 1.16 kg (8.9 moles) of butyl ether and 30 liters (274 moles) of titanium tetrachloride were added to the solid portion in the reaction vessel, and reaction was then effected at 105° C. for 3 hours. After completion of the reaction, the reaction mixture was subjected to solid-liquid separation at the same temperature, and thereafter, the solid portion was washed at the same temperature twice with 90 liters of toluene. Subsequently, thereto were added toluene, 1.16 kg (8.9 moles) of butyl ether and 15 liters (137 moles) of titanium tetra-chloride, and the mixture was subjected to reaction at 105° C. for 1 hour. After completion of the reaction, the reaction mixture was subjected to solid-liquid separation at the same temperature, and thereafter, the solid portion was washed at the same temperature with 90 liters of toluene three times, then with 70 liters of hexane three times, and thereafter dried under reduced pressure to obtain 11.4 kg of a solid catalyst component.

B. Synthesis of Ethylene-propylene Block Copolymer

A SUS-made reactor having an inner volume of 5.5 m³ equipped with a stirrer and a jacket was thoroughly purged with propylene and then charged with 2.5 m³ of n-heptane, 10 moles of triethylaluminum and 1.5 moles of cyclohexylethyldimethoxysilane. Furthermore, the inner temperature was adjusted to 20–40° C. and the pressure to 0.5 kg/cm²G with propylene, after which 0.12 kg of the above-mentioned solid catalyst component was fed. Subsequently, warm water was passed through the jacket to elevate the inner temperature of the reactor to 75° C., and thereafter, the reaction pressure was elevated to 8 kg/cm²G with propylene and hydrogen, to start polymerization. Propylene was continuously fed so that the reaction pressure was kept at 8 kg/cm² at a reaction temperature of 75° C., and the polymerization of a crystalline polypropylene portion (referred to hereinafter as P portion) was continued while the feeding was conducted so that the hydrogen concentration in the gas phase portion was kept at 4.0%. When the integrated amount of propylene fed reached 1180 kg, the feeding of propylene and hydrogen was stopped, and the unreacted monomer in the reactor was removed by degassing to reduce the inner pressure of the reactor down to 0.5 kg/cm²G and simultaneously adjust the inner temperature of the reactor to 60° C.

About 100 g of the polymer of the P portion was sampled and analyzed to obtain the results that the intrinsic viscosity $[\eta]_P$ was 0.83 dl/g and the molecular weight ratio Mw/Mn determined by GPC was 4.4. The amount of the polymer produced in the P portion was calculated from the integrated amount of propylene fed and the weight of unreacted propylene at the time of completion of the polymerization to find that it was 798 kg.

Subsequently, the reaction pressure was elevated to 3 kg/cm²G with propylene and ethylene in the presence of the P portion to start the polymerization of the ethylene-propylene random copolymer portion (referred to hereinafter as EP portion), and then a mixed gas of propylene/ethylene=3/1 (weight ratio) was continuously fed so that the reaction pressure was kept at 3 kg/cm²G at a reaction temperature of 60° C. and the polymerization of the EP portion was continued while the feeding was controlled so that the hydrogen concentration in the gas phase portion was kept at 0.01%.

When the integrated amount of the propylene/ethylene mixed gas fed reached 188 kg, the feeding of the monomers was stopped and the entire amount of the polymer slurry in the reactor was introduced into a deactivating tank to subject the same to deactivation treatment with butyl alcohol, after which the polymer slurry was centrifuged to recover a solid polymer which was then dried by a dryer to obtain 960 kg of a powdery white powder. The intrinsic viscosity $[\eta]_T$ of the overall polymer obtained was 1.44 dl/g and the ethylene content was 5.8% by weight. Also, the polymerization ratio between the P portion and the EP portion was 83/17 by weight as calculated from the quantity of heat of crystal fusion of the P portion and the quantity of heat of crystal fusion of the polymer finally obtained. Accordingly, the ethylene content of the polymer in the EP portion wad 34% by weight and the intrinsic viscosity $[\eta]_{EP}$ of the EP portion was 5.8 dl/g.

To 100 parts by weight of the ethylene-propylene block copolymer obtained were added 0.15 part by weight of calcium stearate, 0.1 part by weight of 2,6-di-t-butyl-4-hydroxytoluene (Sumilizer BHT, a trade name of Sumitomo Chemical Co., Ltd.) and 0.05 part by weight of tetrakis [methylene-3-(3',5'-t-butyl-4-hydroxyphenyl)-propionate] methane (Irganox 1010, a trade name of Ciba Geigy) as stabilizers and the mixture was pelletized using a continuous twin screw kneader, after which a test specimen was prepared by an injection molding and then subjected to measurement of physical properties.

The evaluation results are shown in Table 3. Rigidity, impact strength and fluidity were good.

EXAMPLES 2 AND 3 AND COMPARATIVE EXAMPLES 1, 2, 3 AND 4

The same procedure as in Example 1 was repeated, except that the hydrogen concentration in the gas phase portion during the polymerization of the P portion, the propylene/ethylene ratio during the polymerization of the EP portion and the hydrogen concentration in the gas phase portion at that time were changed as shown in Table 1 and Table 2. The results of evaluation of physical properties of test specimens prepared in the same manner as in Example 1 are shown in Table 3.

TABLE 1

|  | Example 2 | Example 3 |
|---|---|---|
| Hydrogen conc. in gas phase portion during polymerization of P portion (%) | 20 | 7 |
| Propylene/ethylene ratio during polymerization of EP portion (weight ratio) | 1.55/1 | 1.5/1 |
| Hydrogen conc. in gas phase portion during polymerization of EP portion (%) | 0.02 | 0.03 |

TABLE 2

|  | Comp. Ex. 1 | Comp. Ex. 2 | Comp. Ex. 3 | Comp. Ex. 4 |
|---|---|---|---|---|
| Hydrogen conc. in gas phase portion during polymerization of P portion (%) | 10 | 6.5 | 4.5 | 2.0 |
| Propylene/ethylene ratio during polymerization of EP portion (weight ratio) | 1/1.5 | 1.7/1 | 1.7/1 | 1/1.3 |
| Hydrogen conc. in gas phase portion during polymerization of EP portion (%) | 0.15 | 0.01 | 0.04 | 0.2 |

TABLE 3

| Example & Comparative Example | $[\eta]_P$ (dl/g) | $[\eta]_{EP}$ (dl/g) | Ethylene conc. in EP (wt. %) | Content of EP portion (wt. %) | Q value | Isotactic pentad fraction in P portion | MI (g/10 min) | Flexural modulus (kg/cm$^2$) | Izod impact strength 23° C. (kgf · cm/cm) |
|---|---|---|---|---|---|---|---|---|---|
| Example 1 | 0.83 | 4.4 | 34.3 | 16.9 | 4.3 | 0.981 | 89 | 14900 | 4.4 |
| Example 2 | 0.63 | 5.3 | 26.0 | 16.0 | 4.5 | 0.983 | 98 | 15100 | 4.2 |
| Comp. Ex. 1 | 0.80 | 4.6 | 45.9 | 17.0 | 4.2 | 0.980 | 84 | 15000 | 3.4 |
| Example 3 | 0.88 | 5.1 | 34.0 | 13.1 | 4.2 | 0.980 | 66 | 14700 | 4.4 |
| Comp. Ex. 2 | 0.88 | 7.5 | 40.0 | 12.5 | 4.6 | 0.980 | 46 | 13900 | 4.4 |
| Comp. Ex. 3 | 1.04 | 4.2 | 34.0 | 20.6 | 4.0 | 0.983 | 23 | 13300 | 9.2 |
| Comp. Ex. 4 | 1.24 | 3.7 | 35.6 | 19.1 | 4.2 | 0.975 | 14 | 12500 | 8.2 |

Industrial Applicability

The ethylene-propylene block copolymer of this invention is excellent in rigidity, impact resistance and fluidity. Therefore, it is suitable for uses of injection molded articles which require good moldability, short molding cycle and good surface quality such as no generation of flow mark or weldline on a product, no surface strain and the like.

What is claimed:

1. A high rigidity ethylene-propylene block copolymer having a melt flow index (MI) as measured at 230° C. under a load of 2.16 kg of not less than 60 g/10 minutes and which is composed of (I) a crystalline polypropylene portion and (II) an ethylene-propylene random copolymer portion, and in which the crystalline polypropylene portion (I) has a Q value of not more than 5 which is the weight average molecular weight (Mw)/number average molecular weight (Mn) ratio obtained by gel permeation chromatography, an isotactic pentad fraction of not less than 0.98 as calculated from $^{13}$C-NMR, and an intrinsic viscosity of 0.6 to 0.88 dl/g as measured at 135° C. in tetralin; the ethylene-propylene random copolymer portion (II) has an intrinsic viscosity of 4.0 to 6.0 dl/g as measured at 135° C. in tetralin and an ethylene/propylene ratio of 25/5 to 35/65 by weight; and when the total of the above polymers ((I)+(II)) is taken as 100% by weight, the content of the ethylene-propylene random copolymer portion (II) is 8 to 22% by weight.

2. The high rigidity ethylene-propylene block copolymer according to claim 1, wherein the flexural modulus is not less than 13,000 kg/cm$^2$ and the Izod impact strength is not less than 4.0 kfg·cm/cm$^2$ as measured at 23° C.

3. A process for producing a high rigidity ethylene-propylene block copolymer which comprises effecting reaction for producing (I) a crystalline polypropylene portion using a solid catalyst comprising, as the essential components, magnesium, titanium, a halogen and an aluminum compound and subsequently effecting reaction for producing (II) an ethylene-propylene random copolymer portion in the same reactor or a second reactor, comprising controlling the reactor conditions so that the crystalline polypropylene portion (I) has a Q value of not more than 5 which is the weight average molecular weight (Mw)/number average molecular weight (Mn) ratio obtained by gel permeation chromatography, an isotactic pentad fraction of not less than 0.98 as calculated from $^{13}$C-NMR and an intrinsic viscosity of 0.6 to 0.88 dl/g as measured at 135° C. in tetralin; the ethylene-propylene random copolymer portion (II) has an intrinsic viscosity of 4.0 to 6.0 dl/g as measured at 135° C. in tetralin and an ethylene/propylene ratio of 25/75 to 35/65 by weight; and when the total of the above polymers ((I)+(II)) is taken as 100% by weight, the proportion of the ethylene-propylene random copolymer portion (II) becomes 8 to 22% by weight.

4. The process for producing a high rigidity ethylene-propylene block copolymer according to claim 3, wherein the melt flow index (MI) as measured at 230° C. under a load of 2.16 kg is not less than 50 g/10 minutes.

5. The process for producing a high rigidity ethylene-propylene block copolymer according to claim 3 or 4, wherein the flexural modulus is not less than 13,000 kg/cm$^2$ and the Izod impact strength is not less than 4.0 as kgf·cm/cm$^2$ as measured at 23° C.

* * * * *

UNITED STATES PATENT AND TRADEMARK OFFICE
CERTIFICATE OF CORRECTION

PATENT NO. : 6,204,336 B1
DATED : March 20, 2001
INVENTOR(S) : Manabu Hirakawa, Kenichi Ohkawa, Teruhiko Doi, Tetsuya Hisayama, Yuichi Miyake and Takeyoshi Nishio It is certified that error appears in the above-identified patent and that said Letters Patent is hereby corrected as shown below:

<u>Title page,</u>
Item [22], PCT Filed, change "1996" to -- 1997 --.

Signed and Sealed this

Tenth Day of September, 2002

*Attest:*

JAMES E. ROGAN
*Attesting Officer*    *Director of the United States Patent and Trademark Office*